(12) United States Patent
Wei

(10) Patent No.: US 9,864,630 B2
(45) Date of Patent: Jan. 9, 2018

(54) STARTING A PROCESS USING FILE DESCRIPTORS

(71) Applicant: HEWLETT PACKARD ENTERPRISE DEVELOPMENT LP, Houston, TX (US)

(72) Inventor: Wei Wei, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 348 days.

(21) Appl. No.: 14/238,711

(22) PCT Filed: Sep. 26, 2012

(86) PCT No.: PCT/CN2012/081991
§ 371 (c)(1),
(2) Date: Feb. 12, 2014

(87) PCT Pub. No.: WO2013/053289
PCT Pub. Date: Apr. 18, 2013

(65) Prior Publication Data
US 2014/0289731 A1     Sep. 25, 2014

(30) Foreign Application Priority Data

Oct. 12, 2011 (CN) .......................... 2011 1 0308533

(51) Int. Cl.
*G06F 9/45*     (2006.01)
*G06F 9/48*     (2006.01)

(52) U.S. Cl.
CPC .............. *G06F 9/48* (2013.01); *G06F 9/4843* (2013.01)

(58) Field of Classification Search
None
See application file for complete search history.

(56) References Cited

U.S. PATENT DOCUMENTS

| 7,502,813 B2 | 3/2009 | Ljung |
| 2005/0210077 A1* | 9/2005 | Balakrishnan ........ G06F 9/4812 |

(Continued)

FOREIGN PATENT DOCUMENTS

| CN | 1489049 | 4/2004 |
| CN | 101051941 | 10/2007 |

(Continued)

OTHER PUBLICATIONS

CN First Office Action dated Apr. 18, 2013 issued on CN Patent Application No. 201110308533.2 dated Oct. 12, 2011, The State Intellectual Property Office, P.R. China.

(Continued)

*Primary Examiner* — Li B Zhen
*Assistant Examiner* — Lenin Paulino
(74) *Attorney, Agent, or Firm* — Hewlett Packard Enterprise Patent Department

(57) ABSTRACT

According to an example, a method includes: before a first process exits, a kernel receives a connection holding request carrying a File Descriptor (FD) transmitted by the first process, with respect to the FD carried by the connection holding request, the kernel increases a reference count of a file object corresponding to the FD and puts the file object into a cache, the kernel returns cache position information to the first process, such that the first process puts a corresponding relationship between the cache position information and identifier information of a communication connection pointed to by the FD in a predefined storage area; when a second process starts, the kernel receives an FD obtaining request carrying the cache position information transmitted by the second process, reads the file object from the cache, assigns a new FD to the file object and returns the new FD to the second process.

14 Claims, 4 Drawing Sheets

--- before a first process exits, a kernel receives a connection holding request carrying a File Descriptor (FD) transmitted by the first process. For the FD carried by the keeping connection request, the kernel increases a reference count of a file object corresponding to the FD, puts the file object into a cache, and returns cache position information to the first process, such that the first process puts a corresponding relationship between the cache position information and identifier information of a communication connection pointed to by the FD into a pre-defined storage area  — 101

↓ when a second process is started, the kernel receives an FD obtaining request carrying the cache position information transmitted by the second process, reads the file object from the cache, allocates a new FD for the file object and returns the new FD to the second process  — 102

(56) References Cited

U.S. PATENT DOCUMENTS

| | | | | |
|---|---|---|---|---|
| 2010/0082816 | A1* | 4/2010 | Kharat | G06F 9/54 |
| | | | | 709/226 |
| 2012/0204193 | A1* | 8/2012 | Nethercutt | G06F 11/3495 |
| | | | | 719/330 |
| 2013/0332941 | A1* | 12/2013 | Ramesh | G06F 9/4831 |
| | | | | 719/314 |

FOREIGN PATENT DOCUMENTS

| | | |
|---|---|---|
| CN | 101290587 | 10/2008 |
| CN | 101334740 | 12/2008 |
| CN | 102131152 | 7/2011 |
| CN | 102508713 | 6/2012 |
| EP | 2131528 | 12/2009 |

OTHER PUBLICATIONS

CN Second Office Action dated Dec. 9, 2013 issued on CN Patent Application No. 201110308533.2 dated Oct. 12, 2011, The State Intellectual Property Office, P.R. China.

International Search Report and Written Opinion dated Dec. 13, 2012 issued on PCT Patent Application No. PCT/CN2012/081991 dated Sep. 26, 2012, The State Intellectual Property Office, the P. R. China.

\* cited by examiner

STARTING A PROCESS USING FILE DESCRIPTORS

CLAIM FOR PRIORITY

The present application is a national stage filing under 35 U.S.C 371 of PCT application number PCT/CN2012/081991, having an international filing date of Sep. 26, 2012, which claims priority to Chinese patent application number 201110308533.2, filed on Oct. 12, 2011, the disclosures of which are hereby incorporated by reference in their entireties.

BACKGROUND

In an operating system that uses a Unix/Linux kernel, a large amount of system services run at the user space as a Daemon. Therefore, a better service will be provided by a process upgrade instead of a machine restart.

One process may communicate with another process or a kernel in various manners. For example, processes in the same machine may communicate with each other via an Inter Process Communication (IPC) technique. Processes in different machines may communicate with each other via Transmission Control Protocol (TCP)/User Datagram Protocol (UDP). In addition, a process may communicate with a kernel via a netlink socket. In a Unix/Linux kernel, these communication entities may be taken as File Descriptors (FD).

BRIEF DESCRIPTION OF THE DRAWINGS

Features of the present disclosure are illustrated by way of example and not limited in the following figure(s), in which like numerals indicate like elements, in which:

FIG. 3-1 is a schematic diagram illustrating a status of an old process and a kernel before the old process exits, according to an example of the present disclosure.

FIG. 3-2 is a schematic diagram illustrating a status of the old process and the kernel after the old process exits, according to an example of the present disclosure.

FIG. 3-3 is a schematic diagram illustrating a status of a new process and the kernel when the new process starts, according to an example of the present disclosure.

FIG. 3-4 is a schematic diagram illustrating a status of the new process and the kernel after the process is successfully upgraded, according to an example of the present disclosure.

FIG. 4 is a schematic diagram illustrating a structure of a kernel according to an example of the present disclosure.

DETAILED DESCRIPTION

Hereinafter, the present disclosure will be described in further detail with reference to the accompanying drawings and examples to make the technical solution and merits therein clearer.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

During the upgrade of a process, the process is restarted and an FD is closed by a kernel. Thus, a communication peer-end will sense a connection interruption and then trigger a corresponding processing. On the other hand, data changes of the communication peer-end cannot be known by this end. Therefore, after the process is restarted, the communication peer-end has to retransmit all of the data.

A Border Gateway Protocol (BGP) process on a router is taken as an example. When a BGP process on a local machine upgrades, a neighbor will sense the connection interruption. If Graceful Restart (GR) is not enabled, the neighbor will delete all of the BGP routes from the local machine. If GR is enabled, the neighbor does not delete the BGP routes. However, after the BGP process is restarted, all of the neighbors need to retransmit the BGP routes to the local machine.

The conventional upgrading of a process has a great impact and may cause turbulence.

In a practical application, the BGP may adopt a Non-Stopping Routing (NSR) technique to implement the process upgrading without a TCP connection interruption. However, the TCP NSR technique is complicated and needs to backup a large amount of data, which impacts system performance to some extent. In addition, except for TCP, the NSR does not provide sufficient schemes for other communication protocols such as UDP, IPC, netlink, etc. Therefore, the NSR technique cannot be used in general.

In contrast to the above, examples of the present disclosure provide a method and an apparatus for starting a process, so as to reduce complexity when starting the process without a connection interruption.

Figure 1:
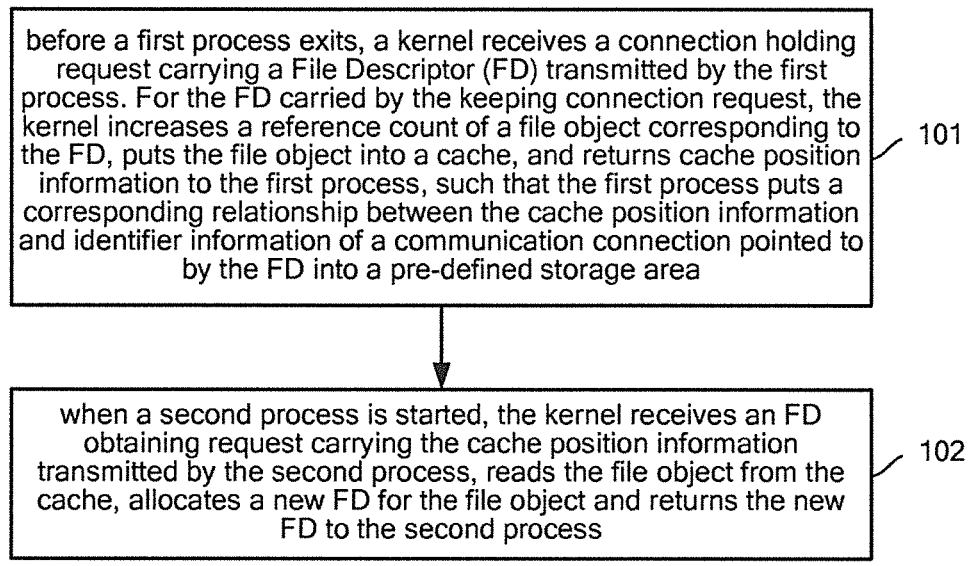
FIG. 1 is a flowchart illustrating a method for starting a process according to an example of the present disclosure.

FIG. 1 is a flowchart illustrating a method for starting a process according to an example of the present disclosure. As shown in FIG. 1, the method includes the following operations.

Block 101, before a first process exits, a kernel receives a connection holding request carrying a File Descriptor (FD) transmitted by the first process. For the FD carried by the connection holding request, the kernel increases a reference count of a file object corresponding to the FD, puts the file object into a cache, and returns cache position information to the first process, such that the first process puts a corresponding relationship between the cache position information and identifier information of a communication connection pointed to by the FD into a pre-defined storage area.

Block 102, when a second process starts, the kernel receives an FD obtaining request carrying the cache position information transmitted by the second process, reads the file object from the cache, assigns a new FD to the file object, and returns the new FD to the second process.

For process upgrade, the first process is an old version process and the second process is a new version process.

For process restart, the first process and the second process are the same process.

Compared with the conventional systems, the technical solution provided by the example of the present disclosure implements process upgrade or restart without communication interruption. The procedure is simple and has little impact on system performance. The solution is fit for communication connections described by FD and may be widely applied.

Hereinafter, the method for starting a process provided by the present disclosure will be described in further detail by taking the process upgrade as an example.

Figure 2:
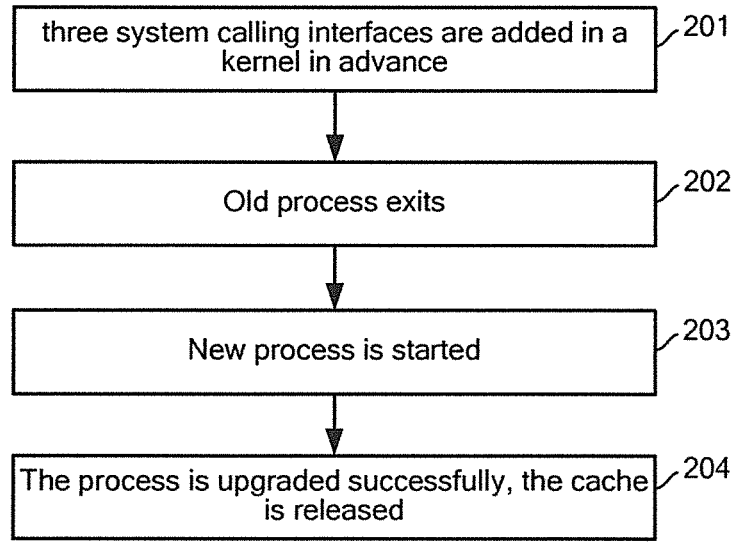
FIG. 2 is a flowchart illustrating a method for upgrading a process according to an example of the present disclosure.

FIG. 2 is a flowchart illustrating a method for upgrading a process according to an example of the present disclosure. As shown in FIG. 2, the method includes the following operations.

Block 201, three system calling interfaces including a connection holding interface, an FD obtaining interface, and a releasing interface are added in a kernel in advance.

For example, the connection holding interface may be int holdFd(int fd), the FD obtaining interface may be int getFd (int key), and the releasing interface may be int putFd(int key).

Block 202, before an old process exits, the old process calls the connection holding interface and transmits to the kernel an FD corresponding to each communication connection needed to be held. For each FD, the kernel increases a reference count of a file object corresponding to the FD, assigns a unique index to the FD, performs a Hash calculation on the index, selects a cache area according to a Hash calculated result, puts the file object into the cache area, and returns the index to the old process. The old process puts a corresponding relationship between the index and identifier information of a communication connection pointed to by the FD in a predefined file. Then, the old process exits.

Since the kernel increases the reference count of the file object corresponding to the FD, when the old process is destroyed, the communication connection pointed to by the FD maintained by the kernel will not be closed because the reference count is not 0.

Block 203, a new process is started. The new process reads the corresponding relationship between the index and the identifier information of the communication connection pointed to by the FD. For each index, the new process calls the FD obtaining interface, and transmits the index to the kernel. The kernel performs a Hash calculation to the index, reads the file object from the corresponding cache area according to the Hash calculated result, and assigns a new FD to the file object and returns the new FD to the new process.

If the process upgrade has failed, the process will restore to the old version. At this time, the old version process may obtain the new FD of each communication connection from the kernel via a similar manner as the new process in block 203.

The file object is invisible to the process but the communication connection is visible to the process.

Block 204, the process is successfully upgraded. For each index read from the predefined file, the new process calls the releasing interface and transmits the index to the kernel. The kernel performs a Hash calculation to the index, reads the file object from the corresponding cache area according to the Hash calculated result, performs a restore operation to the reference count of each file object, deletes each file object in the cache, and releases each index.

Herein, for each file object, in block 204, the objective of performing a restore operation to the reference count of the file object is to restore the reference count of the file object to a value before the old process exits.

It should be noted that the examples of the present disclosure are also applicable for a process restart procedure. At this time, the difference between the process restart procedure and the example shown in FIG. 1 is that the old process and the new process are no longer distinguished. Blocks 201 to 204 are directed to the same process and block 204 is directed to a process after the process is successfully started.

Hereinafter, another example is given to further describe the process upgrade procedure of the present disclosure.

Figures 1, 3:
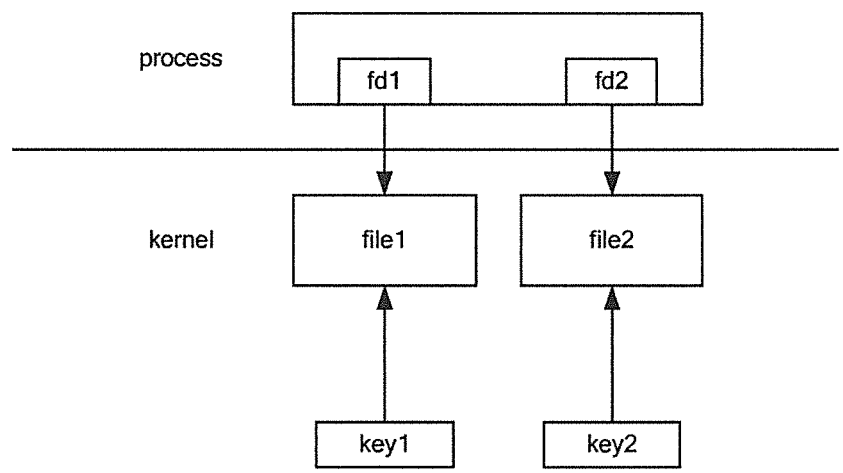
Figures 2, 3:
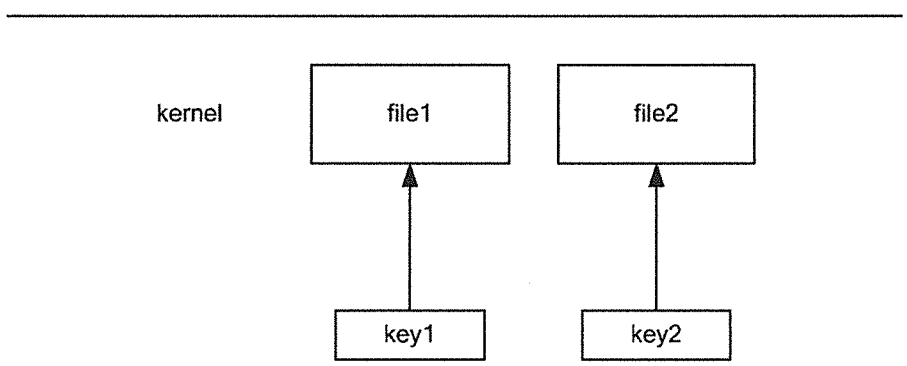
Figure 3:
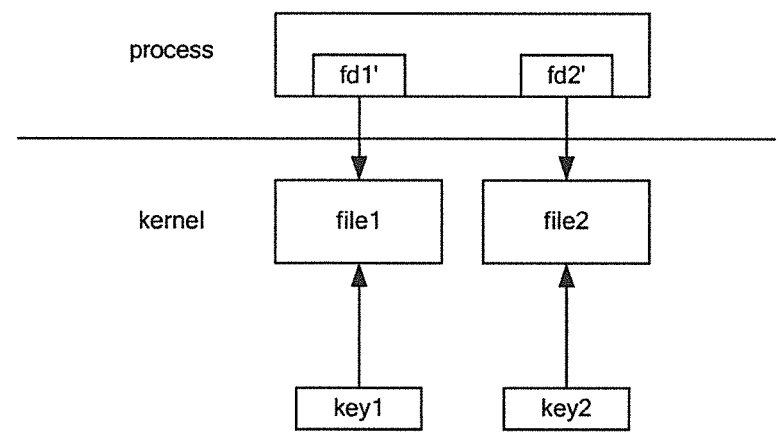

FIG. 3-1 is a schematic diagram illustrating a status of an old process and a kernel before the old process exits, according to an example of the present disclosure. As shown in FIG. 3-1, suppose there are two important communication connections: communication connections 1 and 2 need to be held before the process upgrade, wherein an FD corresponding to communication connection 1 is fd1, an FD corresponding to the communication connection 2 is fd2, a file object in the kernel corresponding to fd1 is file1, and a file object in the kernel corresponding to fd2 is file2. The process upgrade procedure is as follows.

01: before the process is upgraded, the old process calls a connection holding interface, transmits fd1 and fd2 to the kernel. The kernel adds 1 to the reference count of file1 corresponding to fd1, adds 1 to the reference count of file2 corresponding to fd2, assigns an index key1 to fd1, assigns an index key2 to fd2, performs a Hash calculation to key1, selects a cache area 1 according to a calculated result 1, puts file1 into cache area 1, performs a Hash calculation to key2, selects a cache area 2 according to a calculated result 2, puts file2 in cache area 2, and returns key1 and key2 to the old process. The old process puts a corresponding relationship between key1 and communication connection 1 and a corresponding relationship between key2 and communication connection 2 into a predefined file. The old process exits.

FIG. 3-2 is a schematic diagram illustrating a status of the old process and the kernel after the old process exits, according to an example of the present disclosure. As shown in FIG. 3-2, after the old process exits, fd1 and fd2 are closed.

02: a new process is started. The new process reads the corresponding relationship between key1 and communication connection 1 and the corresponding relationship between key2 and communication 2 from the predefined file, calls the FD obtaining interface, and transmits key1 and key2 to the kernel. The kernel performs a Hash calculation to key1, reads file1 from cache area 1 according to the calculated result 1, assigns fd1' to file1, performs a Hash calculation to key2, reads file2 from cache area 2 according to the calculated result 2, assigns fd2' to file2, and returns fd1' and fd2' to the new process.

FIG. 3-3 is a schematic diagram illustrating a status of the new process and the kernel after the new process starts, according to an example of the present disclosure. As shown in FIG. 3-3, when the new process is started, the new process obtains fd1' of communication connection 1 and fd2' of communication connection 2.

03: the process is upgraded successfully. The new process calls the releasing interface, and transmits key1 and key2 to the kernel. The kernel performs a Hash calculation to key1, obtains file1 from cache area 1 according to the calculated result 1, performs a Hash calculation to key2, obtains file2 from cache area 2 according to the calculated result 2, subtracts 1 from the reference counts of file1 and file2, deletes file1 from cache area 1, deletes file2 from cache area 2, and releases key1 and key2.

Figures 3, 4:
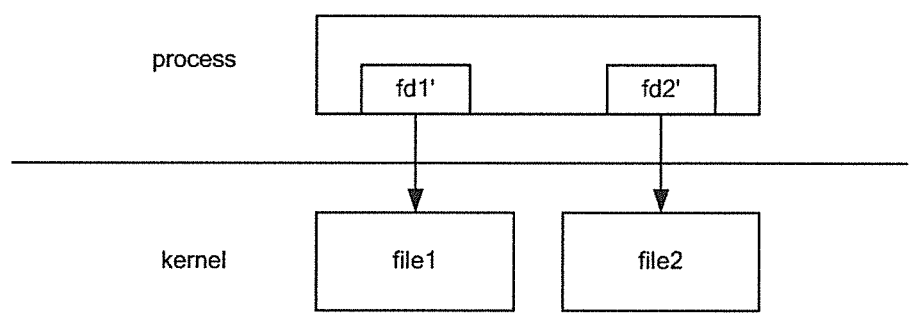
Figure 4:
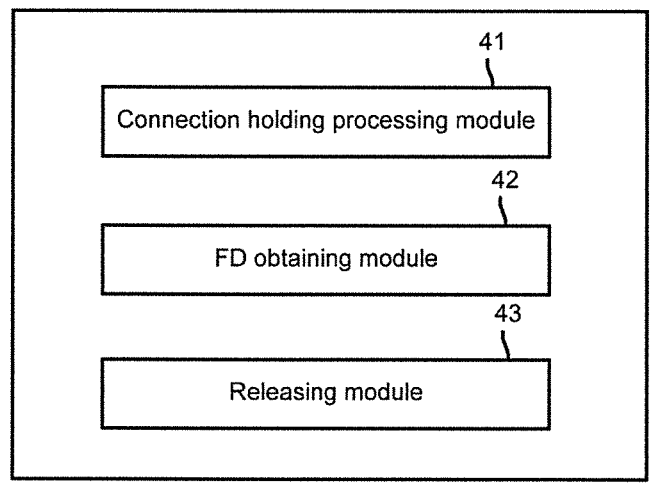

FIG. 3-4 is a schematic diagram illustrating a status of the new process and the kernel after the process upgrades successfully, according to an example of the present disclosure. As shown in FIG. 3-4, after the process upgrades successfully, key1 and key2 are released.

FIG. 4 is a schematic diagram illustrating a structure of a kernel according to an example of the present disclosure. As shown in FIG. 4, the kernel mainly includes: a connection holding processing module 41, an FD obtaining module 42. The connection holding processing module 41 is to receive, before a first process exits, a connection holding request carrying an FD corresponding to a communication connection needs to be held transmitted by the first process, for the FD carried in the connection holding request, increase a reference count of a file object corresponding to the FD, and put the file object into a cache, and return cache position information to the first process, such that the first process puts a corresponding relationship between the cache position information and identifier information of a communication connection pointed to by the FD in a predefined storage area.

The FD obtaining module 42 is to receive, when a second process is started, an FD obtaining request carrying the cache position information of the file object transmitted by the second process, and read the file object from the cache, assign a new FD for the file object and return the new FD to the second process.

For process upgrading, the first process is an old version process and the second process is a new version process. For process restart, the first process and the second process are the same process.

The connection holding processing module 41 is further to, for the FD carried in the connection holding request, assign an index to the FD, perform a Hash calculation to the index, select a cache area according to the calculated result and put the file object corresponding to the FD into the cache area, and when an index in the FD obtaining request transmitted by the second process is received, as to the index, perform a Hash calculation to the index, select a cache area according to the calculated result, and read the file object from the cache area.

The kernel further includes a releasing module 43 to receive, after the second process is successfully started, a releasing request carrying the cache position information transmitted by the second process, and read the file object from the cache, restore the reference count of the file object, and delete the file object in the cache and release each index.

Figure 5:
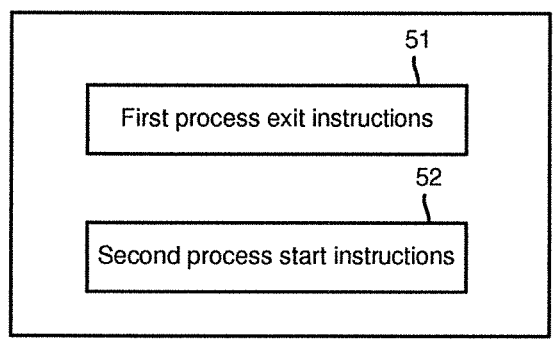
FIG. 5 is a schematic diagram illustrating a structure of a machine-readable storage medium according to an example of the present disclosure.

An example of the present disclosure further includes a machine-readable storage medium, as shown in FIG. 5. The machine-readable storage medium is connected with a processor and stores machine-readable instructions including first process exit instructions 51, executable by the processor to transmit, before the first process exits, an FD corresponding to a communication connection needs to be held in a connection holding request and transmit the connection holding request to a kernel, and receive cache position information of a file object corresponding to the communication connection transmitted by the kernel, and put a corresponding relationship between the cache position information and identifier information of a communication connection pointed to by the FD in a predefined storage area. The machine-readable instructions including second process start instructions 52, executable by the processor to read, when the second process is started, the corresponding relationship between the cache position information and the identifier information of the communication connection pointed to by the FD from the predefined storage area, and transmit the cache position information to the kernel to obtain a new FD of the communication connection.

What has been described and illustrated herein is an example of the disclosure along with some of its variations.

The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The above examples may be implemented by hardware, software or firmware or a combination thereof. For example, the various methods, processes and functional modules described herein may be implemented by a processor (the term processor is to be interpreted broadly to include a CPU, processing unit, ASIC, logic unit, programmable gate array, etc.). The processes, methods, and functional modules may all be performed by a single processor or split between several processors; reference in this disclosure or the claims to a 'processor' should thus be interpreted to mean 'one or more processors'. The processes, methods and functional modules may be implemented as machine readable instructions executable by one or more processors, hardware logic circuitry of the one or more processors or a combination thereof. Further, the disclosure contained herein may be implemented in the form of a computer software product. The computer software product is stored in a non-transitory storage medium and comprises a plurality of instructions for making a computer device (which may be a personal computer, a server or a network device such as a router, switch, access point, etc.) implement the method recited in the examples of the present disclosure.

The figures are only illustrations of an example, wherein the modules or procedure shown in the figures are not necessarily essential for implementing the present disclosure. The modules in the aforesaid examples may be combined into one module or further divided into a plurality of sub-modules.

What is claimed is:

1. A method for starting a process, comprising:
before a first process exits, receiving, by a kernel, a connection holding request carrying a File Descriptor (FD) transmitted by the first process;
for the FD carried by the connection holding request, increasing, by the kernel, a reference count of a file object corresponding to the FD and putting the file object into a cache;
returning, by the kernel, cache position information to the first process, such that the first process puts a corresponding relationship between the cache position information and identifier information of a communication connection pointed to by the FD in a predefined storage area; and
when a second process is started, receiving, by the kernel, an FD obtaining request carrying the cache position information transmitted by the second process, reading the file object from the cache, assigning a new FD to the file object, and returning the new FD to the second process.

2. The method of claim 1, wherein:
the first process is an old version process; and
the second process is a new version process.

3. The method of claim 1, wherein the first process and the second process are the same process.

4. The method of claim 1, wherein putting the file object into the cache by the kernel comprises:
assigning, by the kernel, an index to the FD, performing a calculation to the index according to a predefined algorithm, selecting a cache area according to a calculated result, and putting the file object corresponding to the FD into the cache area;

wherein the cache position information is the index; and wherein reading the file object from the cache by the kernel comprises:

for the index carried in the FD obtaining request transmitted by the second process, performing, by the kernel, a calculation to the index according to the predefined algorithm, selecting the cache area according to the calculated result, and reading the file object from the cache area.

5. The method of claim 1, further comprising:

after the kernel returns the new FD to the second process, and after the second process is started successfully, receiving, by the kernel, a releasing request carrying the cache position information transmitted by the second process, reading the file object from the cache, restoring the reference count of the file object, and releasing the cache.

6. The method of claim 1, wherein the first process and second process are Border Gateway Protocol (BGP) processes.

7. An apparatus comprising:

a processor; and a non-transitory machine readable storage media storing instructions which are executable by the processor to cause the processor to:

receive, before a first process exits, a connection holding request carrying a File Descriptor (FD) corresponding to a communication connection needs to be held transmitted by the first process, for the FD carried in the connection holding request, increase a reference count of a file object corresponding to the FD, put the file object into a cache, and return cache position information to the first process, such that the first process puts a corresponding relationship between the cache position information and identifier information of a communication connection pointed to by the FD in a predefined storage area, receive, when a second process is started, an FD obtaining request carrying the cache position information of the file object transmitted by the second process, and read the file object from the cache, assign a new FD for the file object, and return the new FD to the second process.

8. The apparatus of claim 7, wherein:

the first process is an old version process; and the second process is a new version process.

9. The apparatus of claim 7, wherein the first process and the second process are the same process.

10. The apparatus of claim 7, wherein the instructions are further to cause the processor to:

for the FD carried in the connection holding request, assign an index to the FD, perform a calculation to the index according to a predefined algorithm, select a cache area according to the calculated result, and put the file object corresponding to the FD into the cache area; and for the index carried by the FD obtaining request transmitted by the second process, perform a calculation to the index according to the predefined algorithm, select the cache area according to the calculated result, and read the file object from the cache area.

11. The apparatus of claim 7, wherein the instructions are further to cause the processor to:

receive, after the second process is started successfully, a releasing request carrying the cache position information transmitted by the second process, read the file object from the cache, restore the reference count of the file object, and release the cache.

12. The apparatus of claim 7, wherein the first process and the second process are Border Gateway Protocol (BGP) processes.

13. The apparatus of claim 7, wherein the apparatus is a router.

14. A non-transitory machine-readable storage medium, which is communicatively connected with a processor and stores machine-readable instructions, comprising:

first process exit instructions, executable by the processor to:

receive, before a first process exits, a connection holding request carrying a File Descriptor (FD) transmitted by the first process;

increase, with respect to the FD carried by the connection holding request, a reference count of a file object corresponding to the FD and put the file object into a cache; and return cache position information to the first process, such that the first process puts a corresponding relationship between the cache position information and identifier information of a communication connection pointed to by the FD in a predefined storage area; and second process start instructions, executable by the processor to:

receive, when a second process is started, an FD obtaining request carrying the cache position information transmitted by the second process;

read the file object from the cache; and assign a new FD to the file object and return the new FD to the second process.

* * * * *